United States Patent [19]
Singh

[11] Patent Number: 5,281,437
[45] Date of Patent: Jan. 25, 1994

[54] PRODUCTION OF PARTICULATE SOLID-BEARING LOW DENSITY AIR-PERMEABLE SHEET MATERIALS

[75] Inventor: Tej K. Singh, West Yorkshire, United Kingdom

[73] Assignee: Purification Products Limited, West Yorkshire, United Kingdom

[21] Appl. No.: 853,713
[22] PCT Filed: Dec. 5, 1990
[86] PCT No.: PCT/GB90/01895
    § 371 Date: Jun. 4, 1992
    § 102(e) Date: Jun. 4, 1992
[87] PCT Pub. No.: WO91/08037
    PCT Pub. Date: Jun. 13, 1991

[30] Foreign Application Priority Data
    Dec. 6, 1989 [GB] United Kingdom ............... 8927636

[51] Int. Cl.$^5$ .............................................. B05D 1/12
[52] U.S. Cl. .................................. 427/180; 427/202; 427/294; 427/296; 118/308; 118/312; 428/283; 428/317.9
[58] Field of Search ............... 427/180, 202, 203, 244, 427/294, 296; 118/308, 312; 55/316, 524; 210/503, 504, 505, 508; 428/283, 311.1, 317.9; 264/136

[56] References Cited

U.S. PATENT DOCUMENTS

| | | |
|---|---|---|
| 2,416,695 | 3/1947 | Jessop et al. . |
| 4,081,501 | 3/1978 | Muther . |
| 4,561,380 | 12/1985 | Mulder et al. ............... 118/312 |
| 4,578,068 | 3/1986 | Kramer et al. ............... 428/283 |
| 4,623,560 | 11/1986 | Ayers . |
| 4,800,190 | 1/1989 | Smolik . |
| 4,961,974 | 10/1990 | Jones ............................. 428/317.9 |
| 5,041,104 | 8/1991 | Seal ............................... 428/283 |

FOREIGN PATENT DOCUMENTS

| | | |
|---|---|---|
| 0272798 | 6/1988 | European Pat. Off. . |
| 55-42854 | 11/1980 | Japan ................................ 55/524 |
| WO89/11325 | 11/1989 | PCT Int'l Appl. .............. 55/524 |
| 1283721 | 8/1972 | United Kingdom . |
| 1421346 | 1/1976 | United Kingdom . |
| 2013102 | 8/1979 | United Kingdom . |

Primary Examiner—Terry J. Owens
Attorney, Agent, or Firm—Chester E. Martine, Jr.

[57] ABSTRACT

A method of producing a particulate-solid-bearing air-permeable sheet of material of other than woven and knitted material selected from non-woven fabrics and open cell foam materials includes the following steps: entraining a particulate solid in a gaseous carrier in the substantial absence of fibrous material; disposing one face of a preformed air-permeable sheet material, which material has a density at or below 0.25 g/cm$^3$, in the path of a stream of the gaseous carrier and entrained particulate solid, whilst maintaining a pressure drop across the thickness of the preformed air-permeable sheet material from the one face to the other face of the air-permeable sheet material, whereby to entrap some or all of the entrained particulate solid on or on and in the air-permeable material; and fixing the retained particulate solid on or on and in the air-permeable material with a binder. The mean pore size of the preformed sheet material is greater than the mean particle size of the particulate solid.

15 Claims, 9 Drawing Sheets

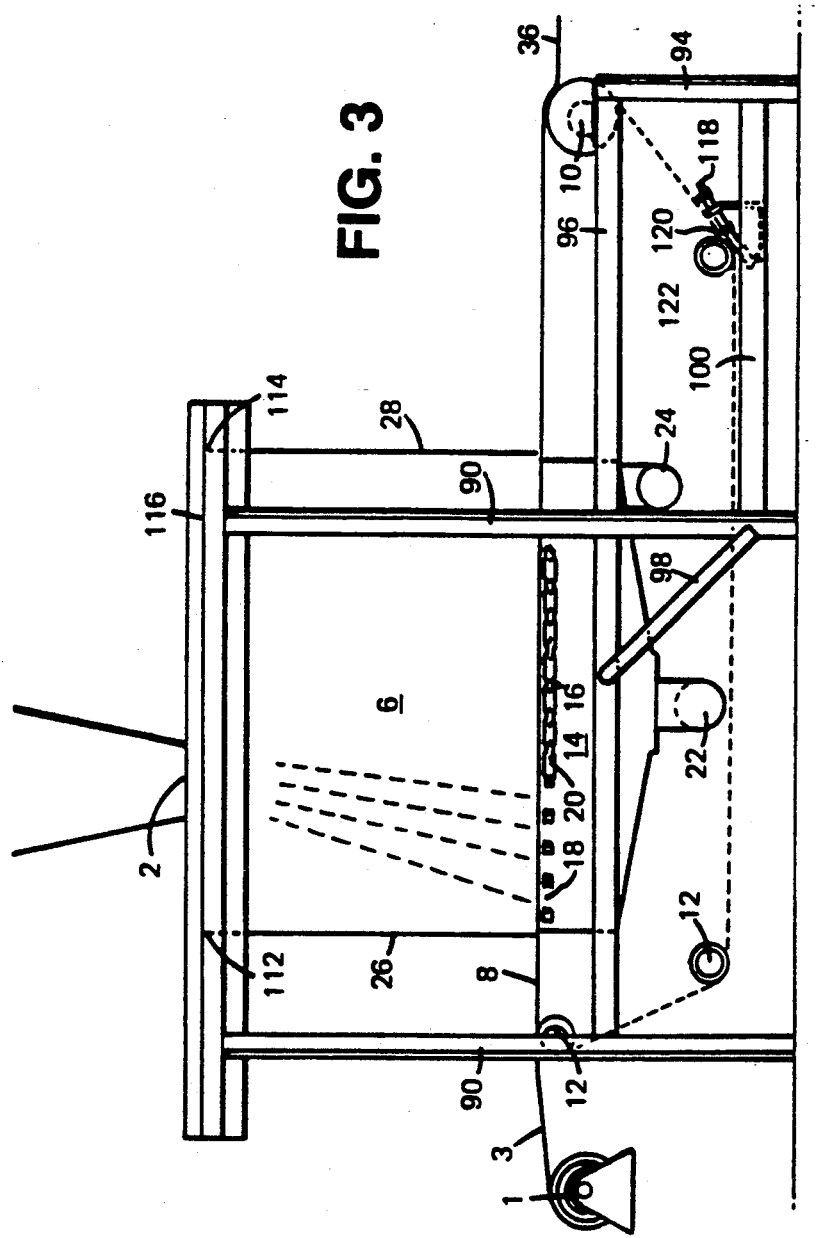

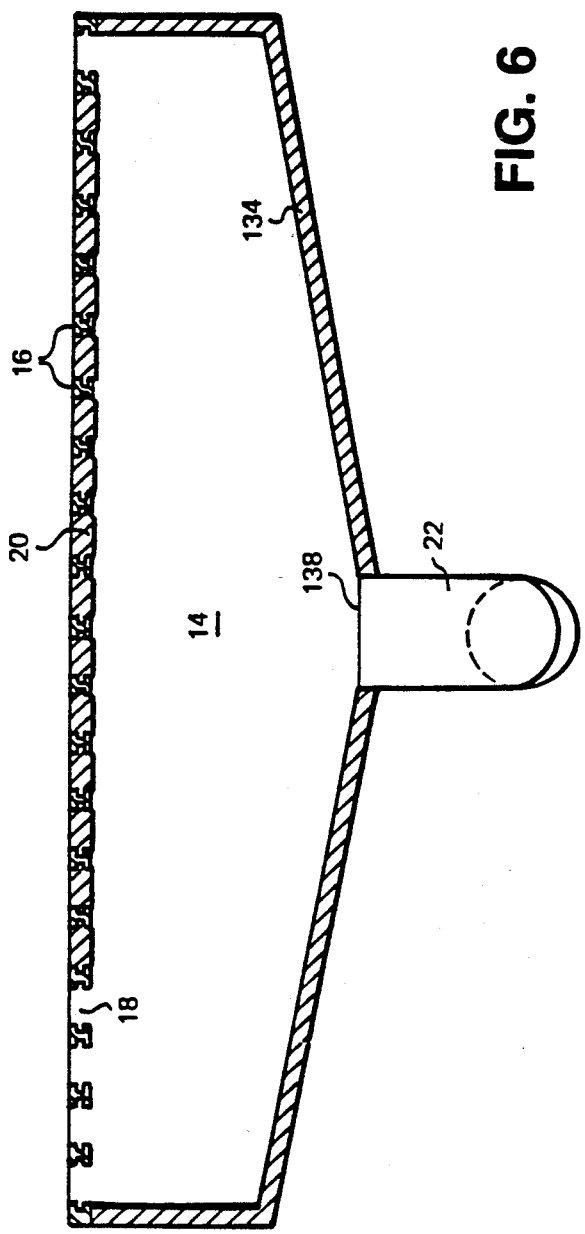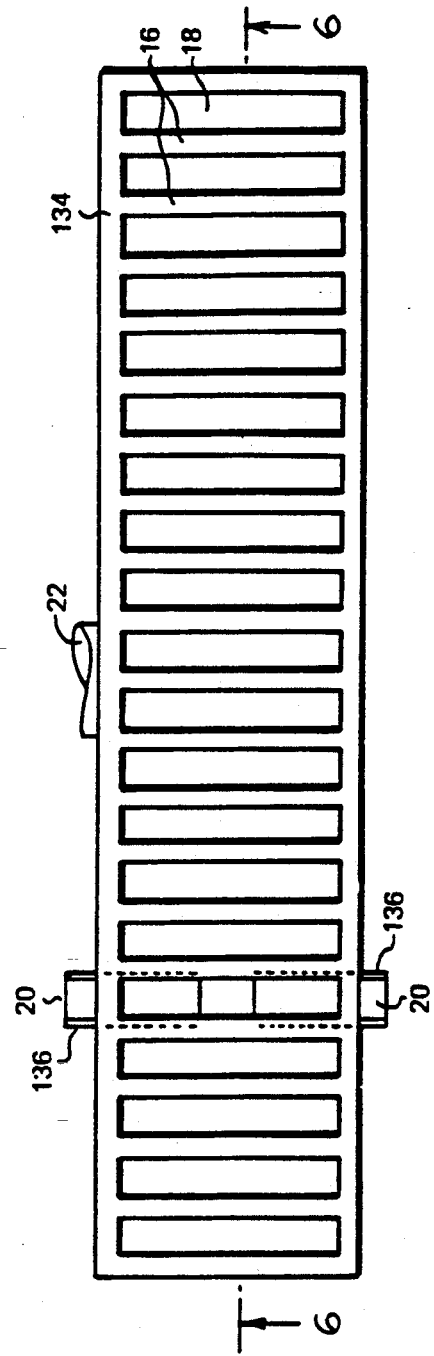

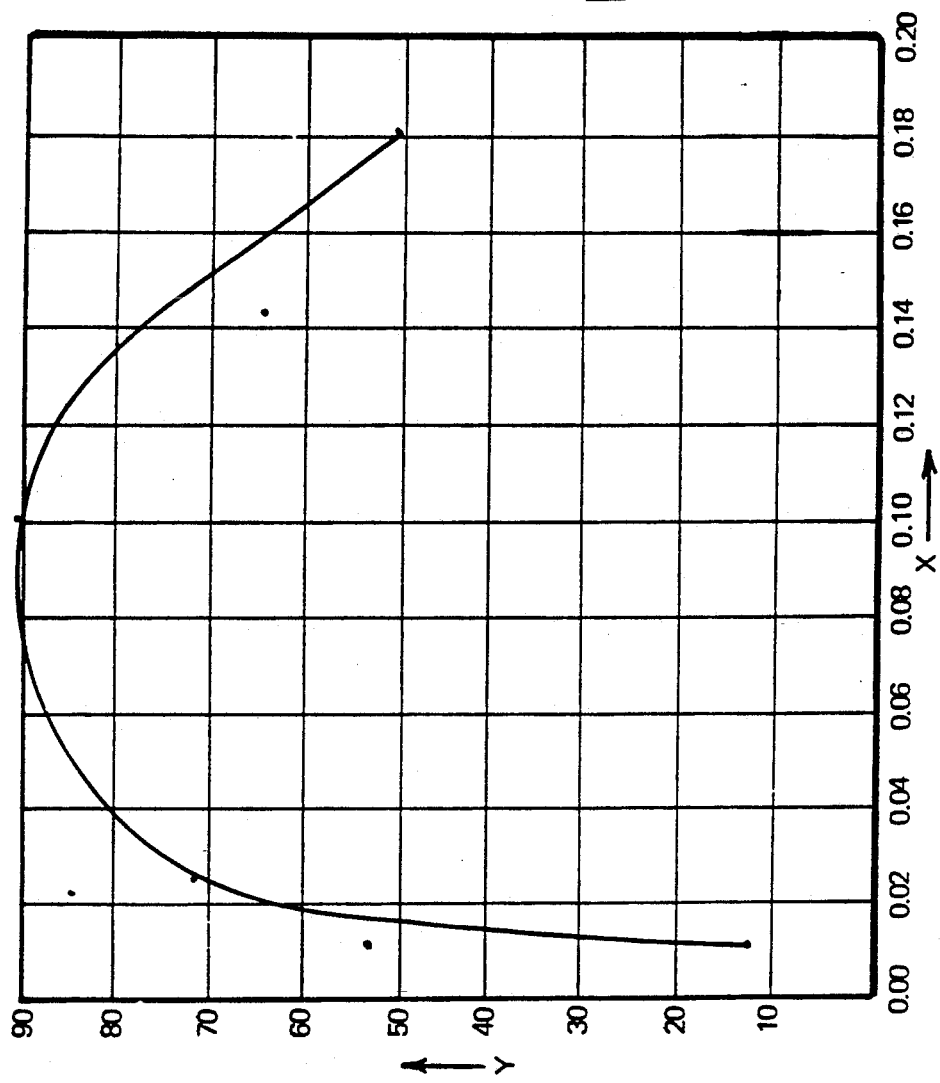

PRODUCTION OF PARTICULATE SOLID-BEARING LOW DENSITY AIR-PERMEABLE SHEET MATERIALS

FIELD OF THE INVENTION

The present invention relates to a method of producing particulate-solid-bearing air-permeable sheet material capable of achieving high concentrations of particulate solid and/or high air-permeability from a low density (0.25 gm/cm$^3$ or less) preformed non-woven fabric or open cell foam.

BACKGROUND OF THE INVENTION

The incorporation of particulate solids in air-permeable sheet materials has been practised for a very long time. Particulate solids may be therapeutic materials and may have an antiseptic or similar effect. Alternatively they may be adsorbents of gases (such as for example active carbon particles, which have been incorporated both in fibrous sheets and in cellular foam sheets).

Several methods have been adopted for incorporating particulate solids in permeable sheet material. One of the simplest is to form a laminate of the particulate solid with two sheets of woven cloth by applying to one of them a free flowing powder before the lamination of the two sheets is effected. This method is however rather primitive and the powdered material is not firmly bound but can shake out of the laminate.

Another method has been to impregnate a fibrous web, e.g. thin webs of a non-woven material with a suspension of the particulate material in a solvent carrier which also incorporates a binder (usually an aqueous latex). This method however necessitates the use of very finely ground powders since to maintain the powder in uniform suspension in the carrier liquid (even with the aid of dispersing agents) is difficult if the particle size is too great. This method also suffers from the disadvantage that the particulate solid loses some of its activity by prolonged contact with organic liquids in the suspension and may also become coated with the binder itself thus preventing those particles which are so coated from being active.

Furthermore when the aqueous suspension is dried (usually by the application of heat) the normal migration of the binder from the centre towards the faces of the web tends to take fine particles with it so that it is difficult with the microparticles used in this process to avoid such migration of the particulate solid. This leads to concentration of the particulate solid adjacent to the faces of the resulting web where the binder is also concentrated by the migration effect.

A considerable amount of activity can therefore be lost and although a considerable weight of powder can be incorporated there is a limit to the activity which can be achieved. Furthermore this process is very expensive to operate and is therefore rarely cost effective in a competitive market.

It has also been proposed in the past to tackify the surface of the fibres in a non-woven fabric by for example applying a solvent which plasticises the fibre surface or by heating to soften the surface of thermoplastic fibres in the non-woven material. After tackifying it has been proposed to apply a particulate solid such as an electrically conductive material to the tackified surfaces as from a suspension in a suitable liquid and then to solidify the surfaces as by removal of solvent or cooling so that the particles of solid remain partially embedded in the surfaces of the fibre. In this way a substantial amount of solid particulate material can be incorporated in the non-woven material. Such tackifying methods are however also disadvantageous in that deactivation of active particles can result and in that costs are high.

GB-A-2013102 describes a method of forming a filter material for use in safety clothing whereby adsorber grains initially on the surface of a base material are forced into the base material. An air current can be used to force the grains into the base material after the latter has been wetted. Alternatively the grains can be placed onto the surface of the dry material and forced into position by violent vibration. Filter material made by this method is stated to prevent the passage of liquid droplets as well as of vapours.

EP-A-0272798 describes a method of reducing the penetrability of a porous material by selectively incorporating particles of a pore modifying agent within the larger pores. A suspension, dispersion or aerosol containing the pore-modifying agent is passed through the material by establishing a pressure differential across the thickness of the material. The difference in flow rate through the large and small pores ensures that substantially all of the pore modifying agent is targetted to the large pores but it is critical that the pore-modifying agent be applied to the material under conditions of low inertia to establish such a flow pattern. The use of high inertia results in the pore modifying agent simply remaining on the surface of the material being treated since it is not then able to follow the flow pattern into the pores. The amount of pore modifying agent incorporated is described as being generally insignificant (e.g. $\leq 1\%$ w/w) compared to the weight of the base material. It is preferred that the pore modifying agent be less than 5 uM in diameter.

GB-A-1421346, relates to the production of moulded fibreglass batting of relatively high density for sound and heat insulation uses by compression moulding at elevated temperature of a fibrous batting containing a particulate thermosetting binder. In one step of the moulding process, particles of binder are entrained in a carrier fluid which is drawn through the fibrous batting by suction, particles which bounce off the surface of the fibrous batting being collected in a collecting duct disposed above the batting. The density of the binder material in the batting is increased by coating the fibres of the fibrous batting with water or oil before the carrier fluid with entrained binder particles is drawn through the batting.

The simultaneous formation of an air-permeable material from fibres admixed with a particulate solid has also been carried out in the past. Thus paper-making methods (both those in the liquid phase and those in which air-laying is utilized) have been used in this way. However depositing a mixture of fibres and powder on a paper machine is a difficult process because of the viscous drag of water drainage on the powders.

A more effective way of using fibres and particulate solid to prepare a particulate solid-bearing-material is by an air laying technique in which a mixture of fibres and powder is deposited using an air stream. One such method is described and claimed in GB-A-1283721. The process of that patent allows heavyweight webs to be loaded with powder. However the upper loading limit is only about 70% by weight. (Percentage by weight as used throughout the present specification is with respect to loaded base material before any processing steps subsequent to the loading of base material with powder, such as the incorporation of binder, have occurred).

The method of GB-A-1283721 can be used for heavy weight i.e. 300 grams per square meter at about 1 mm thick and upwards material (density from 0.3 gm/cm$^2$), the lower economical limit of web weight for this process being about 200 grams per square meter at 0.5 mm thick (density 0.4 gm/cm$^3$), at which weight not more than about 30% by weight of powder can be incorporated. It is not suitable for use with synthetic fibres nor for lightweight webs having very high air or liquid flow rates through the resulting material. It is therefore not suitable for example for preparing webs for use as air filters.

Using the method of GB-A-L 283 721 at below 200 gm per square meter (particularly with synthetic fibres) the webs are difficult to form, the amount of powder which can be incorporated falls rapidly (to well below 30% by weight) and the rate of production falls to uneconomical levels. Furthermore, when this process is applied to the production of lightweight webs, the product uniformity (i.e. the evenness of distribution of powder in the lightweight web) is not satisfactory.

It has also been proposed to mix powders and a latex and then to foam the latex as in GB-A-1471351. Webs made in this way are however virtually impervious to the flow of liquids and air and the activity of the powders is also impaired by the encapsulation of particles of powder.

Only a few of the prior art procedures are applicable to low density materials and even those that are either lower the activity of the particulate solid or are far too costly for general use.

SUMMARY OF THE INVENTION

It is an object of the present invention to provide a method of producing particulate-solid-bearing air-permeable sheet materials from low density air-permeable sheet materials which may be below 1 mm in thickness, which enables high air and liquid flow rates to be achieved in the resulting particulate-solid-bearing air-permeable material and also enables high (e.g. over 80% by weight) loading of particulate solid on or on and in the air permeable sheet material to be made economically without substantial loss of activity of the particulate solid material.

This object is achieved according to the invention by providing a method of producing a particulate-solid-bearing air-permeable sheet material, which comprises: entraining a particulate solid in a gaseous carrier in the substantial absence of fibrous material; characterised in that the method comprises disposing one face of a preformed air-permeable sheet material selected from non-woven fibrous materials and open cell foam materials, which material has a density of at or below 0.25 g/cm$^3$, in the path of a stream of said gaseous carrier and entrained particulate solid, whilst maintaining a pressure drop across the thickness of the preformed air-permeable sheet material from said one face to the other face of said air-permeable sheet material, whereby to retain some or all of the entrained particulate solid on or on and in the air-permeable material; the mean pore size of the pores of the preformed sheet material being greater than the mean particle size of the particulate solid and fixing the retained particulate solid on or on and in the air-permeable material with a binder.

The pore size of a pore is the diameter at the smallest cross-section of that pore. The mean pore size of a sheet material is the average of the pore sizes of the pores present in that sheet material. The mean particle size of a particulate material is the average diameter of the particles of that material.

It has surprisingly been found (contrary to expectation) that retention of the particulate solid is such that % w/w loadings of particulate solid of over 80% (about 90% in some cases) can be achieved with webs having a density at or below 0.25 g/cm$^3$ whilst maintaining high air permeability, and even at a thickness below 1 mm. It would have been expected that such webs would retain very little, if any, of the particulate solid.

As will be illustrated hereinafter in more detail with reference to FIG. 11 of the drawings the effect of using a particulate solid with a particulate size greater than the mean pore size of a sheet material has been found to be blocking of pores and substantial surface deposits which gives uneven distribution of particles in and on the sheet material. In contrast, the method of the invention permits distribution of particles in or in and on the sheet material to be concurrently controlled both over the lateral dimensions of the sheet material and across its thickness as desired coupled with high permeabilty for a given loading.

The present invention need not always be used to achieve loadings at this level. Loadings of from e.g. 10, 20 or 30% w/w to e.g. 50, 70 or 90% w/w (in some cases) by weight can be produced as desired.

The preformed air-permeable sheet material can have a density as low as 0.005, but is preferably equal to or greater than 0.007 and most preferably equal to or greater than 0.010. Whilst the material may have a density as high as 0.25g/cm$^3$ preferably the density is equal to or less than 0.18 and most preferably equal to or less than 0.15.

The present invention can be used in applications where air permeability is important e.g. in the manufacture of filters.

The air permeability will depend on the density of the preformed non-woven fabric or foam, the loading of active particulate solid and the amount of binder incorporated. These parameters are chosen according to the intended end use so that the permeability achievable will depend largely on the end use of the product. For a given end use, the method of the present invention can achieve significantly higher permeabilities than those of products made by prior art methods.

As hereinafter explained the present invention can, for a given loading or particulate material, be used to produce loaded base material with a higher air permeability than prior art methods.

Thus in Example 1 the present invention produces a product with a powder content of 99 g/m$^2$ and an air permeability of 100 L/min/10 cm$^2$ of product, using a 10 mm water gauge.

Using the same particulate material, the method of GB-A-1283721 produces a product with a powder content of 80 g/m$^2$ but with an air permeability of only 76 L/min/10 cm$^2$ of product using a 20 mm water gauge (See comparative Example 1b). Thus, the present invention, for approximately the same loading of particulate material in this instance gives about two and a half times the air permeability achieved by the prior art.

The pressure drop may be effected by maintaining a lower gaseous pressure at said other face of the air-permeable sheet than that extant at the said one face of the air-permeable sheet. Preferably this is effected by applying suction to said other face of the air-permeable material.

Thus one embodiment of the present invention is a method as hereinbefore described wherein a stream of the gaseous carrier and the particulate solid in substantially free flowing form are supplied to a mixing zone; the substantially free-flowing particulate solid material is entrained in the mixing zone in the stream of the gaseous carrier; the mixture of gaseous carrier and entrained particulate solid from said mixing zone is passed into the inlet of, through and out of, the outlet of a supply zone; a suction zone of variable effective length and width is established adjacent and in line with the outlet of said supply zone the effective width and length of said suction zone being greater than the effective width and length of said supply zone; the pressure in said suction zone is reduced to below that at the outlet of said supply zone; and the air-permeable sheet material is continuously fed between said supply zone and said suction zone. Substantially no fibrous material is entrained in the gaseous carrier.

Whilst the present invention can utilize carrier gases such as nitrogen and carbon dioxide, the preferred carrier gas is air. Thus the method of the present invention a method as hereinbefore described comprising establishing a recirculatory flow of air; wherein a stream of air at super atmospheric pressure is passed through the mixing zone and then injected into the supply zone, which supply zone is maintained at atmospheric pressure; air from said supply zone is sucked into the suction zone, which suction zone is disposed adjacent and in line with said supply zone and is maintained at subatmospheric pressure; air from said suction zone is raised to super-atmospheric pressure and is fed to said mixing zone; and the free-flowing particulate solid is fed to said mixing zone.

Whilst the method of the invention can be effected in a batchwise mode (individual sheets of air-permeable material being treated successively) it is preferred for reasons of economy to operate the method on a continuous basis, using a continuous length of air-permeable material. Thus a continuous length of air-permeable sheet material may be passed between the aforementioned supply and suction zones.

The mean pore size is greater than the mean particle size, preferably at least twice the mean particle size.

Wide ranges of particle sizes and bulk densities of particulate solid are suitable for use in the present invention since it has surprisingly been found that subject to the above relationship between mean pore size and mean particle size these factors have only a small effect on the incorporation of particulate solid. Suitable particle sizes are e.g. from 0.5 um to 400 um, more specifically from 8 uM to 250 um.

Suitable bulk densities are e.g. from 0.14 to 2.52 g/cm$^3$ more specifically from 0.3 to 0.67.

Although the density of the air permeable sheet material is an important factor affecting the incorporation of particulate solid, it has surprisingly been found that subject to the above relationship of mean pore size to mean particle size the pore size is relatively unimportant and wide ranges of pore sizes e.g. from 10 to 1000 uM, more specifically from 50 um to 1000 uM, can be used.

The flow rate of the gaseous carrier through the air-permeable material does affect the incorporation of particulate solid, the flow rate in turn depending on the pressure drop across the thickness of the air-permeable material i.e. on the suction applied. The amount of particulate solid incorporated also depends on the time during which the air-permeable material is exposed to the flow of gaseous carrier and entrained particulate solid, e.g. to the dwell time of the continuous sheet between the supply and suction zones. Depending on each of these parameters the amount of the entrained particulate solid which is retained on or on and in the air-permeable sheet may be varied from all the entrained particulate solid to only a proportion of the entrained particulate solid. Where only a portion of the entrained particulate solid is entrapped on and/or in the air-permeable sheet, that portion which passes through e.g. into the suction zone may be recirculated to (albeit another portion of) the air-permeable material again.

When a recirculating system is employed, air which bleeds into the supply zone from outside passes through the sheet material and can be removed from the suction zone via a separate outlet to that provided for recirculation.

Air-permeable materials especially those composed of non-woven fabrics and open cell foams do not in general have a perfectly uniform distribution of voids throughout the material. Consequently the distribution of the particulate solid throughout the air-permeable sheet can never be absolutely uniform. In practice, absolute uniformity of distribution is not however necessary for most applications of the product. A measure of uniformity of distribution in the plane of the sheet is the variation in weight of particulate solid contained within panels of a given area cut out from the sheet at intervals. Thus a continuous sheet material can be notionally divided up into strips extending laterally across the whole width of the sheet and having a predetermined width measured along the continuous axis of the sheet. Thus a variation of $\pm 10\%$ in the weight of particulate solid from one strip to another might be regarded as acceptable. The actual width of the strips analysed is however a crucial factor in determining variability of particle distribution. Thus a 10% variation as between strips 10 cm wide might be achieved, but if the measurements are made on the same sheet with 1 cm strips the variation could exceed 10% as between the 1 cm strips by a substantial margin. The method of the present invention can achieve a distribution of particulate material in the plane of a sheet wherein the weights of particulate material in panels having a smallest surface dimension of 10 cm and of equal area, vary by less than about 10%.

The distribution of particulate solid across the thickness of the sheet is not necessarily uniform. If it is desirable to have a lower concentration of particulate solid on or adjacent to one face of the sheet, this can be achieved by adding water to the air-permeable sheet material to the extent that interconnecting voids in the air-permeable material are filled or partially filled with water before one face thereof is subjected to the stream of carrier gas and entrained particulate solid. The effect of this is to cause the particulate solid to be deposited predominantly on the one face and in the voids adjacent to that one face until the effect of the pressure drop clears the voids of water. The effect is progressive and is also affected by the other parameters such as the gradient of the pressure drop and the duration of its application. This contrasts with the mere wetting of the fibre surfaces in a non-woven material with water or oil described in GB-A-1 421 346.

Thus in the continuous process, by selection of suitable values for the applicable parameters, the particulate material may be concentrated on the one surface with little particulate solid within (i.e. away from the Baid surface of) the air-permeable sheet; or the concentration of particulate solid may vary continuously across the thickness of the sheet from a high value at the one face to a lower value at the other face of the air-permeable material or may be substantially uniform across the thickness of the material. In determining the gradient of concentration across the thickness of the sheet, desirably average values should be determined over a reasonable large area of the sheet (e.g. 10 cm squares).

The method of the present invention has a number of advantages over prior art methods. It lends itself to continuous operation, results in little or no loss in the activity of incorporated active particles and can provide products having high levels of permeability to gases and liquids as well as being capable of enabling high levels of particulate solid (70% w/w based on dry weight of air permeable sheet before incorporation of binder material) to be achieved.

Preformed air-permeable materials for use in the present invention are natural or synthetic fibrous non-woven materials and open cell foams. More specific air-permeable materials are given in the Examples hereinafter described.

The air-permeable sheet may be of any desired thickness consistent with the desired air-permeability. Thus, whilst thicknesses of from 0.1 mm to 0.50 mm can be used, which contrasts with the practical lower limit of about 0.5 mm thickness in the process described in GB-A-1283721, thicker materials up to about 50 mm can be processed by the method of the present invention.

Binders for use in the present invention may take the form of natural or synthetic latexes, e.g. natural rubber latex, NEOPRENE, styrene butadiene, acrylonitrile butadiene, acrylic methyl methacrylate polyvinyl alcohol, polyvinyl acetate, melamineformaldehyde resins, or they may comprise solutions of starch, carboxymethyl cellulose, methyl cellulose or sodium silicate. The latexes may be aqueous.

The binder may be applied to the air-permeable material containing particulate solid by means of an applicator roller which receives the binder solution or suspension from a reservoir via a spreader which spreads the binder over the surface of the applicator roller. The binder is preferably applied in excess; the excess liquid being caught by a tray disposed underneath the air-permeable material which is being impregnated; the excess being recirculated to the binder reservoir. The amount of binder liquids may be further reduced by passing the impregnated air-permeable material over a suction box or through nip rolls. Preferably the air-permeable material is held between two wire meshes during the impregnation with the binder liquids. The air-permeable material impregnated with binder then passes to a drying section where the material is dried.

Alternatively the binder can be applied by spraying, padding, laying of foam and using suction or any other conventional method. If a water soluble binder e.g. polyvinyl alcohol is used, the polyvinyl alcohol in powder form can be entrained in the gaseous carrier together with the particulate solid and deposited in the preformed air-permeable material by the method of the invention. Impregnation of the material with sufficient water to dissolve the polyvinyl alcohol particles can then be used to form the binder in situ.

Drying of the impregnated material can then be effected, using any conventional means for example hot air, radiant heat, heated cylinders etc.

It is also possible to use a thermoplastic binder, in which case the particles of thermoplastic binder can be entrained with the particulate solid to be deposited in and/or on the air-permeable material and resulting material can be passed over heated cylinders or the like to effect melting the thermoplastic particles and bonding of the air-permeable material.

The preferred method of operating the invention however is with latex binders.

One of the advantages of the method of the present invention is that contact between the particulate solid and the liquid binder need be comparatively brief e.g. for less than 60 seconds. The risk of encapsulation of the particles of solid material with binder is therefore low and in the practice of the present invention very little such encapsulation takes place. Furthermore, the size of particles which can be used in the method of the present invention can be large enough to prevent migration of such particles with migration of the binder. A further advantage is that non-compatible binders can be used in the method of the invention (i.e. binders which would precipitate out of solution or suspension on prolonged contact (e.g. contact of over 60 seconds) with the particulate solid. Incompatible binders cannot be used in those prior art methods where such prolonged contact would obtain. Such problems are not evident in the method of the present invention.

The method of the present invention allows the use of a wide range of binders to meet different circumstances without materially increasing the cost of the production.

When entraining powdered materials in gaseous carriers, particularly when the gaseous carrier contains oxygen, it is desirable to include a sufficient amount of moisture so as to prevent the build up of static or to prevent flashing in the event that a flammable powder is entrained. The powder or powder/air (e.g. carbon or carbon/air) mixture can contain 20 to 55% w/w/ e.g. 25 to 35% w/w of moisture (with respect to the dry powder). The amount of moisture should not prevent the particulate solid from being substantially free flowing. The moisture can be added to the powder (if necessary) where it is possible to absorb the moisture within the powder particles themselves, or it can be added to the gas stream for example by injection of steam. Depending upon the humidity of the external environment, the moisture required to be added will vary. In enviroranents of high humidity for example, it will not be necessary to add so much moisture as in environments of low humidity.

BRIEF DESCRIPTION OF THE DRAWINGS

The invention will now be illustrated, without limitation thereof, by way of Example, with reference to the following diagrams, wherein:

FIG. 3 is a detailed view of one form of apparatus suitable for performing the present invention;

FIG. 5 is a plan view of a part of the apparatus shown in FIG. 1, and

FIG. 6 is a section along the line A—A of FIG. 5.

FIGS. 7,8,9,10 illustrate the relationship between density of base material (g/cm$^3$) along the x axes and % loading of particulate material on and in the base material (along the y axes), using different particulate materials and using the apparatus illustrated in FIGS. 3 to 6.

DESCRIPTION OF THE PREFERRED EMBODIMENTS

Figure 1:
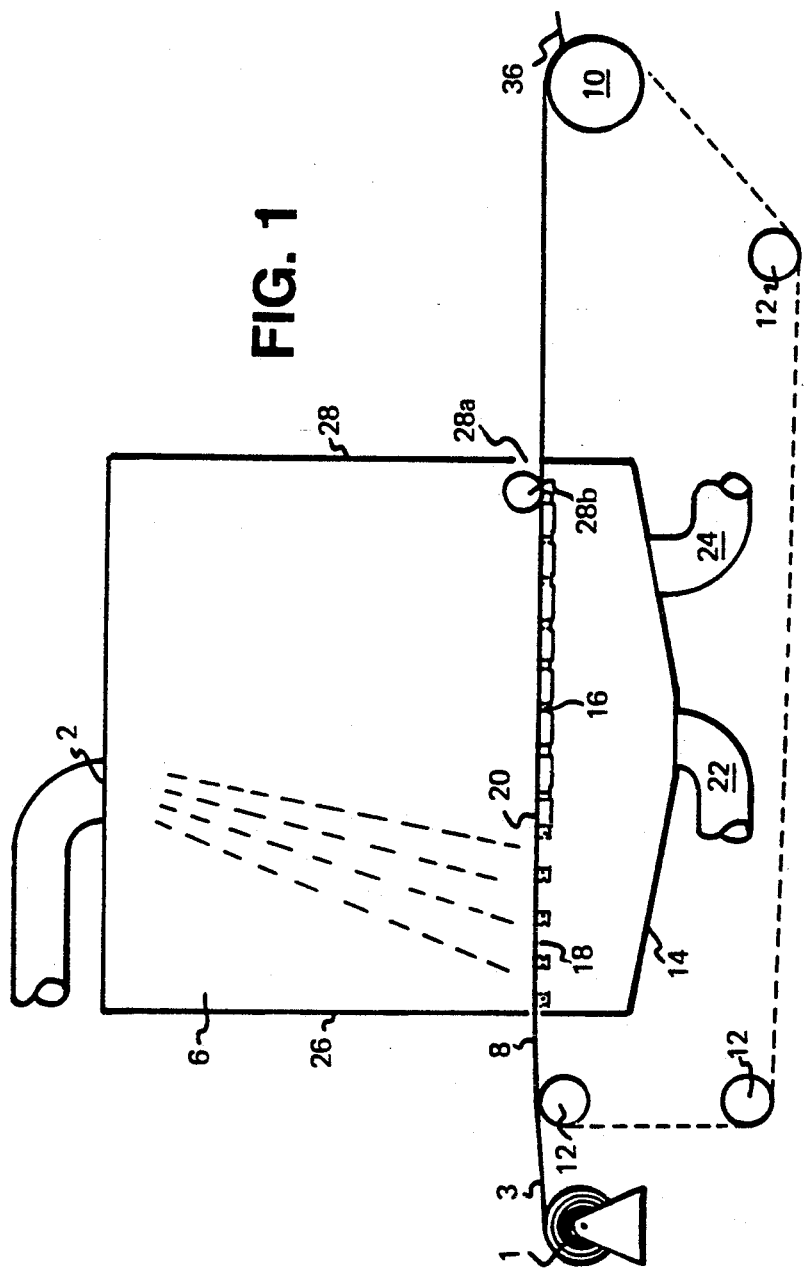
FIGS. 1 and 2 illustrate schematically a process whereby the method of the present invention can be best performed, FIG. 1 showing a part of the process in which particulate material is loaded onto a base material and FIG. 2 a part of the process in which binder is used to fix the particulate material.

Referring to FIG. 1, particulate material is fed at a predetermined rate through inlet 2. The particulate material passes through inlet 2 into settling chamber 6. The particulate material is deposited on or in and on a preformed non-woven base material (hereafter "web") which is supplied from unwind 1 and which is supported upon a moving continuous wire-mesh 8. Wire mesh 8 bearing the web passes across the open base of the settling chamber 6, preferably approximately 1.2 m below the entry of the particulate material from inlet 2. It then passes over rollers 10 and 12, roller 10 being driven by a motor (not shown) thus driving the wire-mesh 8. If the preferred web has sufficient strength the wire-mesh can be dispensed with and the preformed web passed directly onto suction box 14.

Suction box 14 is disposed beneath the open base of the settling chamber 6 so that the wire-mesh 8 passes between the settling chamber 6 and the suction box 14. The top of the suction box 14 may comprise a series of 2.5 cm wide grooved wooden frame members 16 spaced 5.1 cm apart thus leaving a series of 5.1 cm wide openings 18. Each of the openings 18 is provided with one or two slats 20 slidably mounted between each pair of adjacent frame members. Two slats are provided where it is required to vary the effective area of suction, one slat being provided when the suction is not required and the slat is normally closed. Suction is provided by two fans of adjustable speed (not shown) which draw air out of the suction box 14 via outlets 22 and 24. The air extracted from the suction box 14 via outlet 22 is recirculated and is used to carry the feed to inlet 2. The air withdrawn via outlet 24 is the excess air which has leaked in or has deliberately been allowed in as described below. The amount of air blown into the settling chamber 6 may be controlled by adjustment of the flow of recirculated air.

Two walls 26 and 28 of the settling chamber 6 may be adjustable thus enabling a certain amount of air to be led onto the web or allowing air to be passed directly into the left-hand end of the suction box 14.

A gap 28a may also be provided at the bottom of wall 28 to bleed air into the chamber. This gap (when present) may be sealed by roller 28b.

Figure 2:
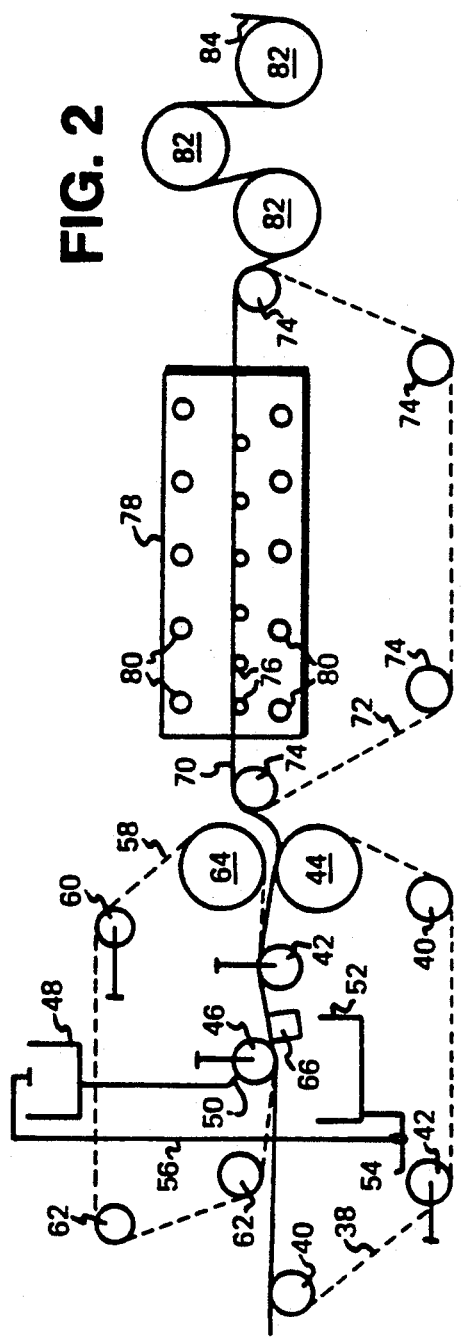

The loaded web 36 then passes to the binder impregnation stage (see FIG. 2).

The loaded web 36 (if not strong enough to be self-supporting) is supported on a moving continuous wire-mesh 38 which passes over rollers 40,42 and 44. The web 36 still supported by the wire-mesh 38 passes under roller 46 where it is impregnated by liquid drawn from reservoir 48 and spread on the roller 46 by means of a spreader 50. Excess liquid flows into tray 52 and is recirculated by pump 54 via pipe 56 to the liquid reservoir 48. A second moving continuous wire-mesh 58 may be provided which passes round rollers 46,60,62 and 64. The binder-impregnated web 36 is then held firmly between the wire-mesh 58 and the first wire-mesh 38 as it leaves roller 46. The two wire-meshes 38 and 58 may be tensioned or slackened, depending upon whether it is desired to compress the web or not. Tensioning is effected by adjustment of rollers 42, 46 and 60.

Further excess liquid is removed from the web by a suction box 66, passed to a separator and then recirculated via tray 52, pump 54 and pipe 56 to liquid reservoir 48.

The wire-meshes in the impregnator, where present, are kept clean by spraying them with water at appropriate intervals. The impregnated web supported by continuous wire-mesh 72, which passes over rollers 74 and 76, passes through infra-red tunnel 78 which is filled with infra-red lights 80. The web is thus dried by the infra-red lights 80 and by circulation of air through the tunnel.

If desired the web may then be passed over a series of drying cylinders 82.

In FIGS., 3, 4, 5 and 6 the corresponding numbers used in relation to FIGS. 1 and 2 are used to designate similar parts.

Figure 4:
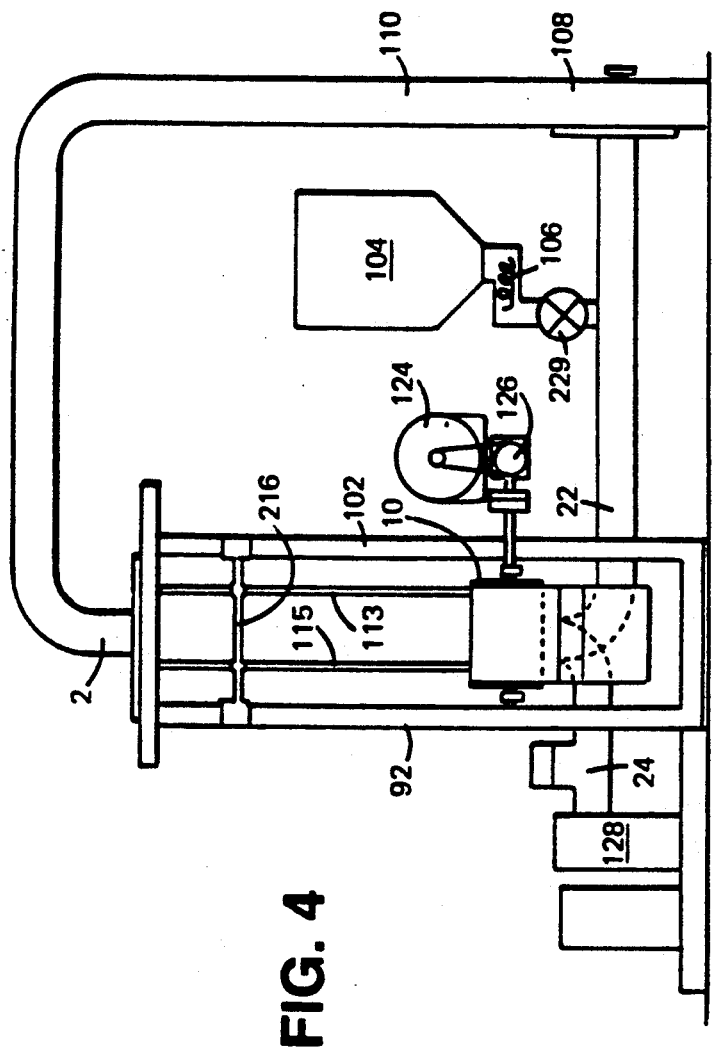
FIG. 4 is an end view of the apparatus shown in FIG. 3.
Figure 7:
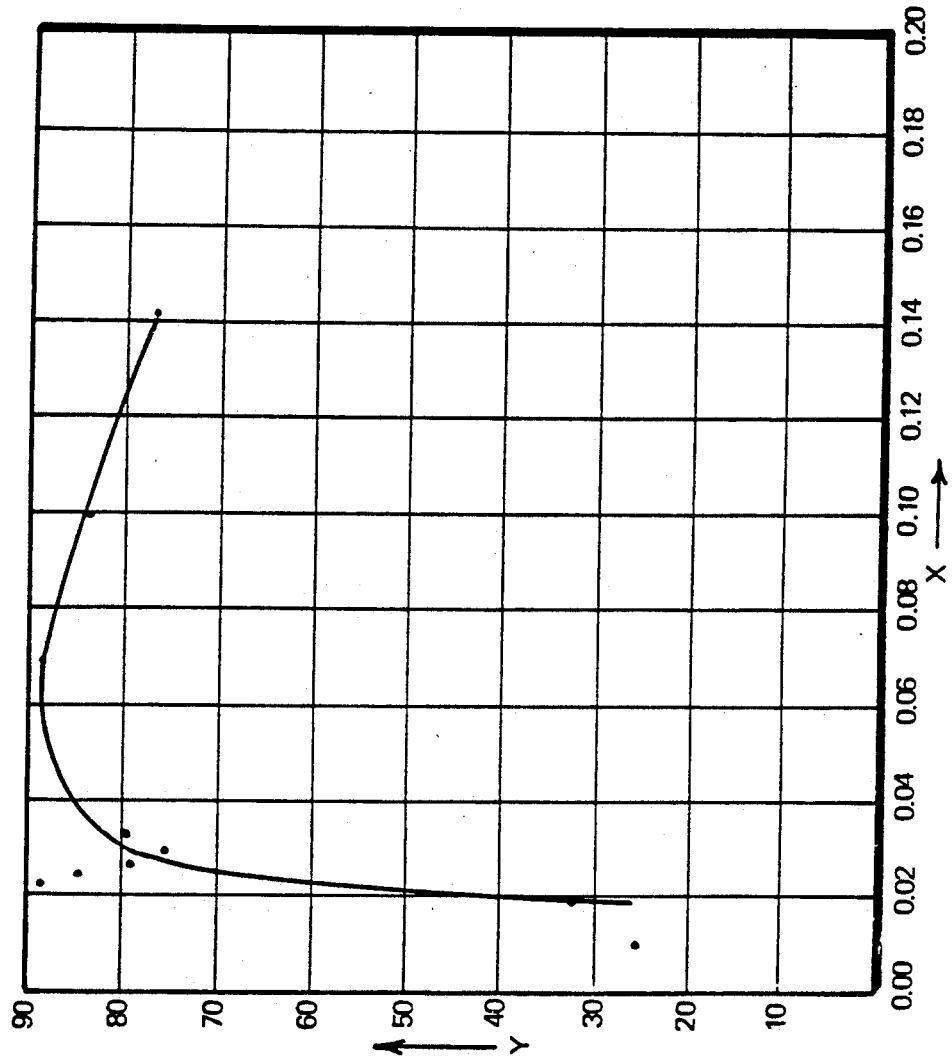
Figure 8:
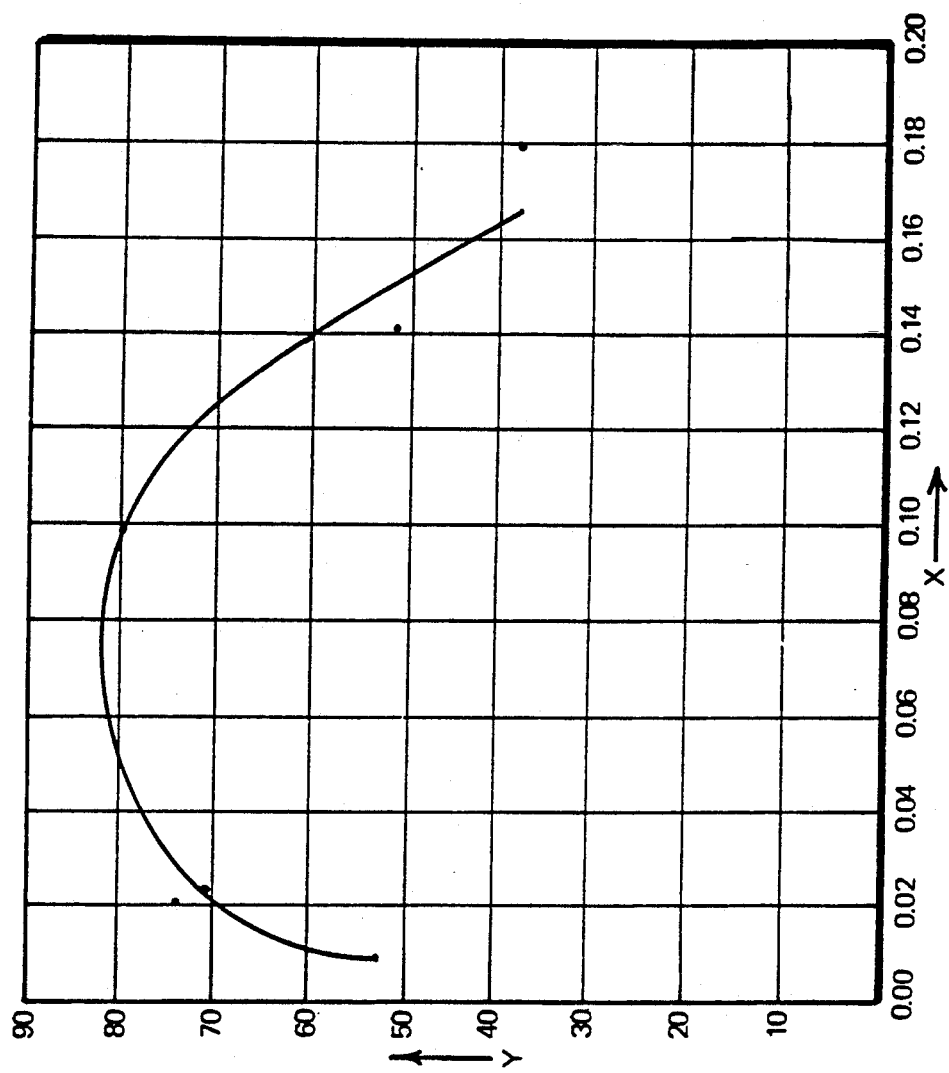
Figure 9:
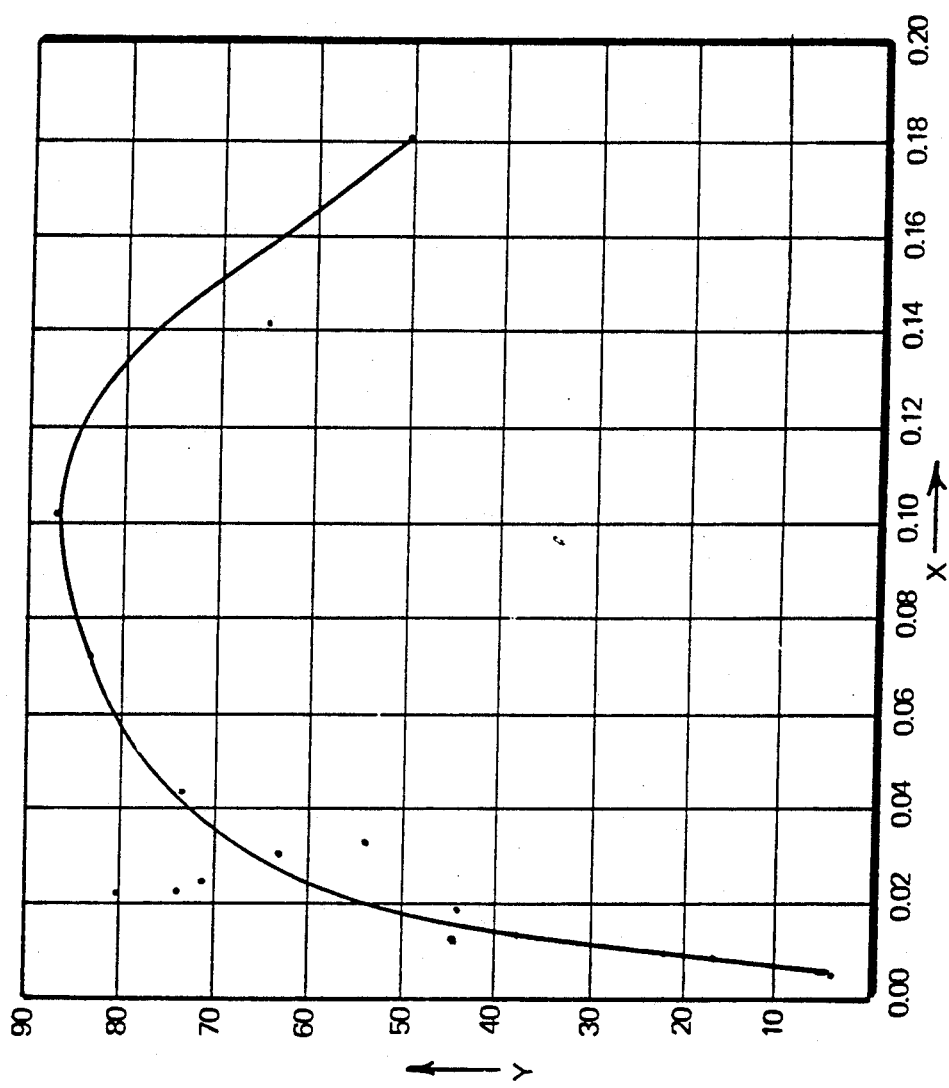

Referring to FIGS. 3 and 4, part of the apparatus is mounted on a frame comprising a number of angle irons 90,92,94,96,98,100,102. A feed hopper 104 is connected via its outlet and a rotary valve 229 to pipe 22, a VI-BRA-SCREW feeder 106 being provided in the outlet of the hopper. Pipe 110 connects pipe 22 to inlet 2, a fan being disposed at point 108 in pipe 110.

Side walls 113 an 115 may be slid along bar 216 to vary the width of settling chamber 6 (for different widths of base material).

A continuous wire-mesh 8 (if required for support of the base material) is mounted on drive roll 10 and tensioning rolls 12 and 122, the tension being adjusted by tightening or loosening screws 118 attached to frame 120 carrying roller 122. The drive roll 10 is driven by a variable speed motor 124 through a gear box 126.

A suction box 14 is disposed below the settling chamber 6. Two outlet pipes 22 and 24 are provided in the suction box, the outlet pipe 24 leading to fan 128 and through to a bag filter (not shown) via a butterfly valve (not shown).

In operation, particulate material is fed from the hopper 104 by the screwfeeder 106, (for example, a VIBRA-SCREW feeder to the pipe 22 by way of rotary valve 229, where it is mixed with the air flowing in the pipe 22 in a mixing zone downstream of the valve 229. The solid particulate material is entrained in the stream of the air in the mixing zone in the pipe 22 downstream of the valve 229. It has been found expedient to incorporate some form of a rotary seal between hopper 104 and pipe 22 to prevent variations in the feed from occurring and also to prevent leakage into the system of more air causing pressure variations.

The particulate solid material entrained in the air flowing in the pipe 22 is then passed via the fan 108 and the pipe 110 into the inlet 2 to settling chamber 6. Such material and air pass downwardly through the settling chamber 6 via an uninterrupted path to the web supported upon continuous wire-mesh 8. The suction box 14 provides a pressure differential across the web and thus serves to maintain the web in contact with the wire-mesh 8. Air is drawn from the suction box through pipes 22 and 24. The air removed through pipe 22 is recirculated with more particulate material fed into pipe 22 from the hopper 104.

The amount of air removed through pipe 24 may be regulated depending on the amount of air bled into the settling chamber. The hinged walls 26 and 28 of the settling chamber may, if desired, be raised at their lower ends to allow air to bleed into the settling chamber at these points.

The web is carried out of the settling chamber 6 after deposition with particulate material and is removed from the mesh 8 as it passes over driving roll 10 and may then be further treated as desired.

Referring to FIGS. 5 and 6, suction box 14 may comprise a number of grooved wooden frame members 16 (usually 2.5 cm in width). A pair of slats 20 comprising tongues 136 are slidably mounted between each adjacent pair of the wooden frame members 16. Where the openings 18 are required to be closed a single slat may replace the pair of slats.

An opening 138 is provided in the base of the tray 134 through which air is removed from the suction box. The opening communicates with outlet pipe 22 at the end of which is disposed a fan (not shown). A second opening in the suction box 14 which connects with pipe 24 is not shown in FIGS. 4 and 5.

Two slats 20 are slidably disposed in each of the gaps 18 between frame members 16 of suction box 14 so that these openings 18 may be opened or closed as desired by lateral movement of each pair of slats outward or inward as the case may be. In general since only the first half dozen or so of the slats 20 used need to be in the open position, the remaining pairs of slats are preferably replaced by a single slat covering the whole width of the suction chamber. Usually one or other of the last two gaps 18 in the sequence adjacent the forward end of the suction box are left open.

In the following examples part of the air from the suction box was immediately filtered by a filter bag for re-use. Unless otherwise stated, no moisture was added to the particulate material since most of the examples were performed in short runs and therefore the risk of flashing was low. Various particulate materials were loaded onto various base materials and were fixed using a binder. Mean pore size was determined using The Bubble Pressure Test described in British standard Number BS 3321:1960.

Mean particle size was determined using the Malvern Method. This method is described in USA Standard MBS PART 52577. For each of these substances, the supplier is given below, together with the trade name under which that particular product can be obtained from the supplier. For the base materials the particular example number or comparative example number in which the material was used is given. ((C) indicates a comparative example).

| Particulate Material Trade Name | Supplier |
| --- | --- |
| Grade C Carbon | Chemviron Carbons Limited, 113 High Street, Uppermill, Oldham, Lancs. OL3, 6BD England |
| Grade CA-1 Carbon | Norit (UK) Limited Clydesmill Place, Cambusland Industrial Est. Glasgow, G32 8RF, Scotland. |

-continued

| | |
| --- | --- |
| Silica Gel and Gasil GM2 A Quality −0.25 mm | Crosfield Chemicals Limited Bank Quay Works, Warrington, Cheshire WA5 1AB, England. |
| Super Absorbent Material Favor SAB 922 | Stockhausen GmbH T Division, Bayer House. Manchester Road, Altrincham Cheshire WA14 5PF, England. |

| Binder Trade Name | Supplier |
| --- | --- |
| Acronal LA471S | B.A.S.F. Plc, Earl Road, Cheadle Hulme, Cheadle, Cheshire, SK8 6QG, England. |

| Example or Comparative Example No. | Base Material Trade Name | Supplier |
| --- | --- | --- |
| 5(C) | Chemically Bonded Nonwoven Porvair | Porvair Limited Estuary Road, King's Lynn Norfolk, PE30 2HS, England |
| 1*,12*,20*, 33*,11,16, 31,37, 3,34,13,23 | Chemically Bonded Polyester Bonella Ultraloft 95 g/m$^2$ Needled Polyester Dutexim 41-06 60/m$^2$ | Bonar Carelle Limited, Nobel Road, Geordie, Dundee, DD2 4UH, Scotland. Tharreau Industrie, z.l. de la Pierre Blance P.B. 49-49120, Chemille, France |
| 17,32,38 | Thermally Bonded Fabric from Heterofil Fibre N 17 Silver Grey Pique | Camtex Fabrics Limited, Blackwood Road, Lillyhall North, Workington, Cumbria CA4 4JJ, England. |
| 1a(c) | Cotton Scrim 44 × 36 bleached | Whiteside Mfg. Co. Limited Thames Industrial Estate. Higher Ardwick, Manchester M12 6BZ, England. |
| 10,15,30,36, | Chemically Bonded Viscose 16 g/m$^2$ Nonwoven | Mansell Bonded Fabrics, Unit 2, Hythe Quay, Colchester CO2 8JB, England. |
| 18 19 | Polyester High Bulk Fleece JW60 JW100 Warren Gruppe 50 2731 Qualitex High Bulk Fleece 60 g/m$^2$ and 100 g/m$^2$ | Jute Webberei Emsdetten GmbH, Postfach 1455, Rheiner Str. 125, D4407 Emsdetten, Germany. |
| 28 | Needled and Chemically Bonded, Polyester (L3) Liplisse 3 100 g/m$^2$ | Libeltex NV Marialoopsteenweg 51, B-8860, Belgium. |
| 9,29 2,22 5,24 8,27 7,26, | LD32 Chemically Bonded Polyester No. 201 LD58 Bulked Chemically Bonded Polyester No. R13416B LD65 Mechanically Entangled Polyester Malifleece 3/4 D Tex 65 g/m$^2$ LD73 Bulked Chemically Bonded Polyester Ref. R13444C LD90 Mechanically Entangled Polyester Malifleece 12 D Tex 96 g/m$^2$ | Ledacare Limited Longshaw Industrial Park Highfield Road, Blackburn, Lancs BB2 3AS England. |
| 6,25,35, | Polyurethane Foam | Caligen Foam Limited Broad Oak, Accrington, Lancs. BB5 2BS, England. |
| 4,14, | Needled Bonded Polyester Paramoll VN413A | Lohmann UK Limited Credsec House, Oxford Road, Stone, Aylesbury, Bucks. HP17 8PL, England. |
| 21 | Blue Lofted | Midland Filter Products |

-continued

| | Nonwoven | Limited, Building 6, Cavalry Hill, Weedon, Northants, NN7 WPS England. |
|---|---|---|
| 1b(c) | Polypropylene Net GS 3736 | Smith and Nephew Plastics Limited, Gilberdyke, North Humberside, HU15 2TD, England. |
| 3(c) | Fibre Glass Mat (Davids) Fastglass from Japan) | W. David & Sons Limited Donington Ind. Estate, Wellingborough, Northants, England. |
| 2(c) | Paper (R36-00501 Yellow Brown Gumming Kraft) | P. Garnett & Son Limited, Wharfeside, Otley, W. Yorkshire, LS21 1QJ, England. |

*These materials when obtained from the supplier but before use as base materials, where expanded by briefly heating until they were of the calipers shown in the Examples.

Binder was used as an aqueous solution at the % w/v figures given below for the given Examples:

| Example No. | % w/v of Binder |
|---|---|
| 1 to 11 | 7% |
| 12 to 17 | 3.5% |
| 18 to 38 | 9% |
| Comparative Example 1a | 9% |
| Comparative Example 1b | 8% |
| Comparative Examples 2 to 5 | 9% |

EXAMPLE 1

This example was performed using the apparatus illustrated in FIGS. 3, 4, 5 and 6 above and using silica gel as the particulate material. The silica gel had a mean particle size of 110 um and a bulk density of 0.674 g/cm$^3$. It was loaded into the hopper 104 and was passed through the inlet 2 into the settling chamber 6 at a rate of 162 g/min, whilst a base material, of 330 mm width which was supported upon the wire mesh was passed over the suction box at a feed rate of 1 meter per minute. The base material had a weight of 95 g/m$^2$, a caliper of 9.8 mm and an air flow of over 100 liters/min/10 cm$^2$ at 1 mm water guage. The mean pore size of the base material was 764 um. The silica gel particles were loaded onto the base material. The loaded base material was then transported to the impregnator where it was impregnated with ACRONAL LA471S binder. Excess binder was removed partly by squeezing the impregnated material between the two wire meshes of the impregnator and partly by suction from a suction box situated below the lower wire mesh of the impregnator. The impregnated material was then partially dried in an infra-red tunnel and then passed over a bank of paper-drying cylinders for further drying. The resultant product had a weight of 135 g/m$^2$ and a thickness of 4.4 mm. Its density was 0.031g/cm$^3$ and it had an air permeability of 65L/min when measured on a 10 cm$^2$ piece of material using a pressure of 1 mm water gauge. Its mean pore size was 732 um and its Latex content and particulate material (powder) content were 4.0 g/m$^2$ and 34 g/m$^2$ respectively. The percentage powder content was determined for this as for the other Examples and Comparative Examples with respect to weight of the product less its binder content (i.e. with respect to the weight of base material plus powder). The percentage powder content was found to be 26% w/w. These results are set out in Table 1.

EXAMPLES 2 to 11

The procedure described in Example 1 was repeated but using different base materials. The properties of the base materials used and of the products obtained are given in Table 1.

EXAMPLES 12 to 17

The procedure described in Example 1 was repeated but using GASIL as the particulate material (mean particle size 8 um; bulk density 0.437 g/cm$^3$) and using the base material given in Table 2 (together with the results obtained).

EXAMPLES 18 to 32

The procedure described in Example 1 was repeated but using Grade C carbon as the particulate material (mean particle size 41 um; bulk density 0.435 g/cm$^3$ and using the base materials given in Table 3 (together with the results obtained).

EXAMPLES 33 to 38

The procedure described in Example 1 was repeated but using Grade CA1 carbon as the particulate material (mean particle size 35 to 40 um; bulk density 0.30 g/cm$^3$) and using the base materials given in Table 4 (together with the results obtained).

EXAMPLES 39 to 41

The procedure described in Example 1 was repeated but using the base materials set out below and varying the procedure as set out below:

EXAMPLE 39

A needled polyester nonwoven web with a basis weight of 65 g/m$^2$ and a bulk density of 0.0215 g/cm$^3$ was fed through the production machine at a width of 1150 mm and a speed of 200 meters/hour. An active carbon powder (Grade C) was fed into the machine at the rate of 30 kg/hour. The resultant carbon/nonwoven web was impregnated with a latex binder ACRONAL LA471S of 5% w/w solids and then dried to give a pick up of latex of 11% w/w.

The finished product which has the following properties was used for the purification of air and the production of face masks.

| Basis Weight | 200 g/m$^2$ |
|---|---|
| Caliper | 1.20 mm |
| Air flow | 150L/min/10 cm$^2$/10 cm water gauge |
| Pore size - mean | 160 um |
| Active carbon content | 114 g/m$^2$ |

EXAMPLE 40

The same conditions and materials as for Example 41 were used but the speed of the machine was reduced to 160 meters/hour.

The resulting web with the following properties was used in multilayer wound cartridges for the filtration of water.

| Basis Weight | 225 gm/m$^2$ |
|---|---|
| Caliper | 1.25 mm |
| Air Flow | 90L/min/10 cm$^2$/10 cm water gauge |
| Pore size - mean | 134 um |
| Active Carbon | 142 g/m$^2$ |

EXAMPLE 41

A needled and chemically bonded nonwoven web at a width of 1600 mm was fed into the machine at a speed of 170 meters/hour. An active carbon powder (Grade C) was fed into the machine at the rate of 42 kg/hour. The resulting active carbon/nonwoven web was impregnated with a latex binder ACRONAL LA471S of 12% w/w solids and then dried to give a latex pick up of 20%.

The finished web with a very high air flow and the following properties was used in air purification in air conditioning units.

| | |
|---|---|
| Basis Weight | 220 gm/m$^2$ |
| Caliper | 2.55 mm |
| Air flow | 500L/min/10 cm$^2$/10 cm water gauge |
| Pore size - mean | 352 um |
| Active Carbon Content | 88 g/m$^2$ |

COMPARATIVE EXAMPLE 1a

The scrim described in Example 1 of GB-A-1283721 used as base material in the process described in Example 1 above, but using the base material at a width of 300 mm; using grade C carbon as particulate material, adding water to the carbon to bring its total moisture content to 40% (with respect to the dry carbon); and using a feed rate (the rate of feed of the carbon into the settling chamber) of 270 g/min. Most of the carbon was concentrated on one surface of the product.

COMPARATIVE EXAMPLE 1b

The procedure described in GB-A-1283721 was carried out using a polypropylene net as support (as set out in Table 5) which was run through the machine at a width of 330 mm and a speed of 1 meter/min., using a mixture of 20 parts by weight of polyester fibre and 90 parts by weight of grade C carbon as the particulate material; and using a total feed rate of the carbon and fibre to the settling chamber of 162 g/min.

Most of the carbon and polyester was concentrated on one surface of the product.

COMPARATIVE EXAMPLE 2

The procedure described in Example 1 above was repeated but using paper as the base material (as set out in Table 5) which was run through the machine at a width of 330 mm and a speed of 1 meter/min, using grade C carbon as the particulate material and using a feed rate of the carbon of 162 g/min. The paper used had a Bendtson air porosity of 450 (i.e. when a piece of the paper of 10 cm$^2$ area was tested using a 150 mm water gauge, a reading of 450 ml/min was obtained).

COMPARATIVE EXAMPLE 3

The procedure described in Comparative Example 2 was repeated but using 250 mm wide glass fibre mat as the base material (as set out in Table 5) and using a feed rate of carbon of 123 g/min.

COMPARATIVE EXAMPLE 4

The procedure described in Comparative Example 2 was repeated but using polyurethane foam as an initial base material and using grade CA1 carbon as the particulate material.

A product having a mean pore size of 256 um and a bulk density of 0.697 g/cm$^3$ and an active carbon content of 625 g/m$^2$ was obtained. This product (hereafter known as "carbon impregnated foam") was used as the base material for a subsequent deposition of particulate material.

In the subsequent deposition, the procedure described in Comparative Example 2 was repeated but using the carbon impregnated foam as the base material (as set out in Table 5) and using absorbent grains (Super Absorbent Material Favor SAB922) with a mean particle size of 450 um and a bulk density of 0.697 g/cm$^3$ as the particulate material. It was observed that the absorbent grains gelled up on impregnation of the product with latex. The product was very brittle and was cracked.

COMPARATIVE EXAMPLE 5

The procedure described in Example 1 was repeated but using grade C carbon as the particulate material and using chemically bonded non-woven material as the base material (as set out in Table 5). Most of the carbon was concentrated on one surface of the product.

DISCUSSION OF EXAMPLES AND COMPARATIVE EXAMPLES

The results for Examples 1 to 11, 12 to 17, 18 to 32 and 33 to 38 are shown in Tables 1, 2, 3 and 4 respectively (in which "—" indicates that no data was available and ">" indicates a reading which was very high) and in FIGS. 7, 8, 9 and 10 respectively. This data supports the inventive step of the present application in achieving high loadings of particulate material whilst using a base material of low density. If FIGS. 7, 8, 9 and 10 were extrapolated along the X-axes to show results for the loading of higher density base materials with particulate material, the curves would gradually level off and would then adopt a positive gradient. Conventionally, high density base materials have been used when high powder loadings have been required since (prior to the present invention) the skilled man was unaware of the results for base materials of low density and would not have regarded research into the loading of such materials with particulate material as being worth trying. This is because the skilled man would have expected that, as the density of base material is reduced from the range which prior to the present invention was used when high powder loading was required, the percentage particulate material loading would also fall.

Examples 39 to 41 illustrate various industrial applications of products of the present invention. These products can be made more cheaply and more efficiently than by using the methods of the prior art since it has been found that, for a given loading of particulate material, the present invention requires less base material and less binder.

The Comparative Examples illustrate the advantages of the present invention over prior art methods and products. Comparative Examples 1a and 1b illustrate the non-suitability of the base materials described in GB-A- 1283721 for the present invention. In both of these Comparative Example only low percentage powder loadings were achieved and the activity of those few carbon particles which had been loaded with the base materials was low owing to migration of binder to the surface. Furthermore, the uniformity of distribution of carbon through the base material was poor, with most of the carbon being concentrated on the upper surface of the material.

In Comparative Example 2, a fairly high percentage loading of carbon was achieved using a paper base material as described in EP-A-0272798 but, as in Comparative Examples 1a and 1b, the uniformity of distribution of carbon through the base material was poor with most of the carbon being concentrated at or around the upper surface of the material. The "blacking" of the paper sheet is effected in its low air permeability. Indeed the base paper was so tight that merely impregnating it with binder would render it impervious (irrespective of any incorporation of particulate material).

In Comparative Example 3, a glass fibre mat as described in GB-A-1421346 was used as the base material. This method was expensive and did not achieve a high percentage loading with particulate material. Indeed, much cheaper base material can be used to achieve this percentage loading and so this method would not be of practical application for fabric or foam base material.

Comparative Example 4 illustrates the non-applicability of the method described in GB-A-2013102 to the present invention since the end product was cracked and, apart from the cracks, had hardly any air flow.

Comparative Example 5 illustrates the importance of using particulate material in the process of the present invention which has a mean pore size which is greater than the mean particle size of the particles which are to be loaded on or on and in the base material. In this Comparative Example a mean particle size of 41 um was used which was considerably larger than the mean pore size, resulting in low retention of powder and poor air permeability.

Figure 11:
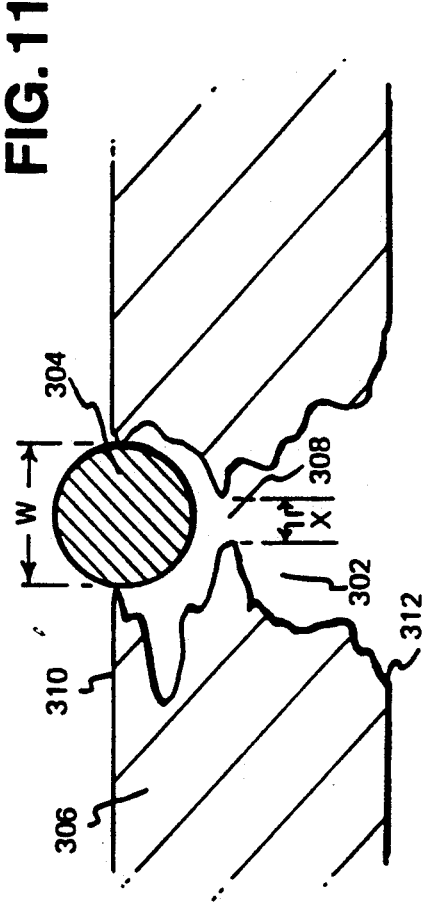
FIG. 11 shows a cross section of a pore of a base material which has been loaded with particles of a greater mean size than the mean size of the pores of material.

This situation is illustrated by FIG. 11, in which a particle 304 of particle size w is shown in pore 302 which has pore size x. The pore is in base material 306 and the air pressure of air adjacent to lower surface 312 is less than of air adjacent to upper surface 310.

Particle 304 effectively blocks pore 302 leading to a lower air flow through the pore. Without being bound by theory, this situation is believed to have occurred in many of the pores of the material used in Comparative Example 5, leading to a material in which most of the particles are at or around one surface of the material and the air flow is low.

This contrasts with the process of the present invention where it is required that the mean pore size of the sheet material be greater than the mean particle size of the particulate material. The present invention allows concurrent control of the distribution of particles in or on and in the sheet material both over the lateral dimension of the sheet material and across its thickness.

In one embodiment of the process of the present invention, water can be used to fill or partially fill the pores adjacent to one surface of the sheet material before loading the material with particles. This allows particles to be located predominantly near to one surface of the material but does not cause substantial blockage of the pores and achieves a substantially even distribution of particles laterally across the material.

TABLE 1

| Example No. | BASE MATERIAL | | | | | | | PRODUCT | | | | | | |
|---|---|---|---|---|---|---|---|---|---|---|---|---|---|---|
| | Description of base material | Basis Weight g/m² | Caliper mm. | Density g/cm³ | Air Flow L/min/10 cm² | Measured at mm water gauge | Pore size mean (µm) | Basis Weight g/m² Bone Dry | Caliper mm. | Apparent Density g/cm³ | Latex Content g/m² | Powder Content g/m² | Powder Content % w/w | Air Flow L/min/10 cm² | Measured at mm. water | Pore Size mean (µm) |
| 1 | Chemically Bonded Polyester | 95 | 9.8 | 0.01 | >100 | 1 | 764 | 135 | 4.4 | 0.031 | 4.0 | 34 | 26 | 65 | 1 | 732 |
| 2 | Bulked Chemically Bonded Polyester | 58 | 3.0 | 0.19 | >100 | 1 | 931 | 87 | 1.48 | 0.059 | 1.5 | 28 | 33 | >100 | 1 | 648 |
| 3 | Needled Polyester | 65 | 3.0 | 0.0215 | 88 | 5 | 197 | 394 | 2.14 | 0.184 | 6.0 | 307 | 79 | 47 | 20 | 139 |
| 4 | Needled and Chemically Bonded Polyester | 106 | 4.7 | 0.0225 | 70 | 2 | 423 | 552 | 3.6 | 0.153 | 10 | 430 | 79 | 70 | 20 | 313 |
| 5 | Mechanically Entangled Polyester | 65 | 2.85 | 0.0228 | 105 | 5 | 229 | 375 | 1.55 | 0.24 | 10 | 308 | 84 | 68 | 20 | 149 |
| 6 | Polyurethane Foam | 65 | 2.65 | 0.0245 | 76 | 50 | 338 | 407 | 2.6 | 0.16 | 10 | 337 | 85 | 23 | 50 | 242 |
| 7 | Mechanically Entangled Polyester | 90 | 3.0 | 0.03 | 36 | 1 | 402 | 441 | 2.39 | 0.185 | 16 | 323 | 76 | 100 | 50 | 229 |
| 8 | Bulked Chemically Bonded Polyester | 73 | 2.25 | 0.033 | 85 | 1 | 561 | 380 | 1.79 | 0.212 | 10 | 297 | 80 | 110 | 100 | 241 |
| 9 | Chemically Bonded Polyester | 32 | 0.46 | 0.07 | 25 | 1 | 197 | 313 | 0.85 | 0.368 | 8 | 270 | 89 | 82 | 100 | 67 |
| 10 | Chemically Bonded Viscose | 16 | 0.16 | 0.10 | 90 | 2 | 242 | 103 | 0.54 | 0.191 | 3 | 84 | 84 | 49 | 5 | 113 |
| 11 | Chemically Bonded Polyester | 85 | 0.6 | 0.142 | 83 | 5 | 188 | 429 | 1.58 | 0.272 | 10 | 324 | 77 | 73 | 100 | 51 |

TABLE 2

| Example No. | Description of base material | BASE MATERIAL | | | | | | PRODUCT | |
|---|---|---|---|---|---|---|---|---|---|
| | | Basis Weight g/m² | Caliper mm. | Density g/cm³ | Air Flow L/min/10 cm² | Measured at mm. water gauge | Pore size mean (μm) | Basis Weight g/m² Bone Dry | Caliper mm |
| 12 | Chemically Bonded Polyester | 95 | 9.8 | 0.01 | >100 | 1 | 764 | 201 | 5.0 |
| 13 | Needled Polyester | 65 | 3.0 | 0.0215 | 88 | 5 | 197 | 236 | 1.39 |
| 14 | Polyurethane Foam | 65 | 2.65 | 0.0245 | 76 | 50 | 338 | 226 | 2.56 |
| 15 | Chemically Bonded Viscose | 16 | 0.16 | 0.10 | 90 | 2 | 242 | 80 | 0.42 |
| 16 | Chemically Bonded Polyester | 85 | 0.6 | 0.142 | 83 | 5 | 189 | 192 | 0.99 |
| 17 | Thermally Bonded Fabric from heterofil fibre | 135 | 0.8 | 0.18 | 51 | 20 | 74 | 247 | 1.02 |

| Example No. | PRODUCT | | | | | | |
|---|---|---|---|---|---|---|---|
| | Apparent Density g/cm³ | Latex Content g/m² | Powder Content g/m² | Powder Content % w/w | Air Flow L/min/10 cm² | Measured at mm water gauge | Pore Size mean (μm) |
| 12 | 0.0428 | 13 | 107 | 53 | 61 | 1 | 496 |
| 13 | 0.179 | 13 | 174 | 74 | 112 | 100 | 154 |
| 14 | 0.095 | 18 | 160 | 71 | 30 | 100 | 229 |
| 15 | 0.20 | 4 | 64 | 80 | 87 | 50 | 217 |
| 16 | 0.20 | 7 | 97 | 51 | 34 | 100 | 107 |
| 17 | 0.251 | 9 | 94 | 38 | 22 | 100 | 58 |

TABLE 3

| Example No. | Description of base material | BASE MATERIAL | | | | | | PRODUCT | | | | | | | |
|---|---|---|---|---|---|---|---|---|---|---|---|---|---|---|
| | | Basis Weight g/m² | Caliper mm | Apparent Density g/cm³ | Air Flow L/min/ 10 cm² | Measured at mm water gauge | Pore Size mean (μm) | Basis Weight g/m² Bone Dry | Caliper mm | Apparent Density g/cm³ | Latex Content g/m² | Powder Content g/m² | Power Content % w/w | Air Flow L/min/10 cm² | Measured at mm water gauge |
| 18 | Polyester High Bulk Fleece | 60 | 12.0 | 0.005 | >100 | 1 | 764 | 67 | 1.93 | 0.035 | 3 | 4 | 6 | 96 | 1 |
| 19 | Polyester High Bulk Fleece | 100 | 16.0 | 0.0063 | >100 | 2 | 496 | 165 | 4.14 | 0.040 | 17 | 48 | 20 | 53 | 1 |
| 20 | Chemically Bonded Polyester | 95 | 9.8 | 0.01 | >100 | 1 | 764 | 154 | 4.11 | 0.037 | 22 | 37 | 28 | 75 | 2 |
| 21 | High Bulk Non-woven Polyester | 208 | 16.2 | 0.013 | 74 | 5 | 647 | 345 | 7.78 | 0.044 | 38 | 99 | 32 | 100 | 10 |
| 22 | Bulked Chemically Bonded Polyester | 58 | 3.0 | 0.019 | >100 | 1 | 931 | 123 | 1.27 | 0.097 | 20 | 45 | 44 | 71 | 1 |
| 23 | Needled Polyester | 65 | 3.0 | 0.0215 | 88 | 5 | 197 | 372 | 1.52 | 0.245 | 52 | 255 | 80 | 10 | 100 |
| 24 | Mechanically Entangled Polyester | 65 | 2.85 | 0.0228 | 105 | 5 | 229 | 298 | 1.23 | 0.343 | 44 | 189 | 74 | 70 | 100 |
| 25 | Polyurethane Foam | 65 | 2.65 | 0.0245 | 76 | 50 | 338 | 263 | 2.58 | 0.102 | 42 | 156 | 71 | 14 | 100 |
| 26 | Mechanically Entangled Polyester | 90 | 3.0 | 0.030 | 36 | 1 | 402 | 279 | 2.07 | 0.135 | 36 | 153 | 63 | 88 | 10 |
| 27 | Bulked Chemically Bonded Polyester | 72 | 2.25 | 0.033 | 85 | 1 | 561 | 206 | 1.27 | 0.162 | 30 | 103 | 59 | 71 | 10 |
| 28 | Needled and Chemically Bonded Polyester | 150 | 3.50 | 0.043 | 76 | 5 | 205 | 653 | 2.71 | 0.241 | 91 | 412 | 73 | 7 | 100 |
| 29 | Chemically Bonded Polyester | 32 | 0.46 | 0.07 | 25 | 1 | 197 | 220 | 0.845 | 0.260 | 27 | 161 | 83 | 12 | 100 |
| 30 | Chemically Bonded Viscose | 16 | 0.16 | 0.10 | 90 | 2 | 242 | 165 | 0.80 | 0.204 | 24 | 123 | 87 | 12 | 100 |
| 31 | Chemically Bonded Polyester | 85 | 0.60 | 0.142 | 83 | 5 | 188 | 277 | 1.38 | 0.201 | 34 | 158 | 65 | 75 | 100 |
| 32 | Thermally Bonded Fabric from Heterofil Fibre | 135 | 0.80 | 0.18 | 51 | 20 | 74 | 304 | 1.26 | 0.241 | 33 | 136 | 50 | 18 | 100 |

TABLE 4

BASE MATERIAL

| Number | Description of base material | Basis Weight g/m² | Caliper mm. | Apparent Density g/cm³ | Air Flow L/min/10 cm² | Measured at mm. water gauge | Pore Size mean (μm) |
| --- | --- | --- | --- | --- | --- | --- | --- |
| 33 | Chemically Bonded Polyester | 95 | 9.8 | 0.01 | 36 | 1 | 764 |
| 34 | Needled Polyester | 65 | 3.0 | 0.0215 | 88 | 5 | 197 |
| 35 | Polyester Polyurethane Foam | 65 | 2.65 | 0.0245 | 76 | 50 | 338 |
| 36 | Chemically Bonded Viscose | 16 | 0.160 | 0.10 | 90 | 2 | 242 |
| 37 | Chemically Bonded Polyester | 85 | 0.6 | 0.142 | 83 | 5 | 188 |
| 38 | Thermally Bonded Fabric from Heterofil Fibre | 135 | 0.8 | 0.18 | 51 | 20 | 74 |

GRADE CA1 PRODUCT

| Number | Basis Weight g/m² Bone Dry | Caliper mm. | Apparent Density g/cm³ | Latex Content g/m² | Powder Content g/m² | Powder Content % w/w | Air Flow L/min/10 cm² | Measured at mm. water gauge |
| --- | --- | --- | --- | --- | --- | --- | --- | --- |
| 33 | 127 | 3.715 | 0.034 | 18 | 14 | 13 | 60 | 1 |
| 34 | 609 | 2.770 | 0.22 | 151 | 393 | 85 | 10 | 100 |
| 35 | 306 | 3.015 | 0.101 | 76 | 165 | 72 | 14 | 200 |
| 36 | 210 | 0.975 | 0.215 | 40 | 154 | 91 | 22 | 200 |
| 37 | 297 | 1.74 | 0.171 | 54 | 158 | 65 | 17 | 100 |
| 38 | 334 | 1.295 | 0.258 | 56 | 143 | 51 | 7 | 200 |

TABLE 5

BASE MATERIAL

| Comparative Example Number | Material | Basis Weight g/m² | Caliper mm. | Apparent Density g/cm³ | Air Flow L/min/10 cm² | Measured at mm. water gauge | Pore Size mean (μm) |
| --- | --- | --- | --- | --- | --- | --- | --- |
| 1a | Cotton Scrim | 85 | 0.14 | 0.208 | — | — | — |
| 1b | Polypropylene net | 16 | 0.11 | 0.145 | > | > | > |
| 2 | Paper | 64 | 0.145 | 0.44 | 0 | 200 | — |
| 3 | Glass Fibre Mat | 308 | 0.85 | 0.36 | 90 | 5 | — |
| 4 | Carbon Impregnated Foam | 144 | 0.48 | 0.30 | 33 | 100 | 256 |
| 5 | Chemically Bonded Nonwoven | 143 | 0.60 | 0.24 | 7 | 100 | 14 |

PRODUCT

| Comparative Example Number | Basis Weight g/m² Bone Dry | Caliper mm. | Apparent Density g/cm³ | Latex Content g/m² | Powder Content g/m² | Powder Content % w/w | Air Flow L/min/10 cm² | Measured at mm. water gauge |
| --- | --- | --- | --- | --- | --- | --- | --- | --- |
| 1a | 110 | 0.435 | 0.253 | 16 | 9 | 10 | 79 | 5 |
| 1b | 214 | 1.35 | 0.159 | 17 | 80 | 41 | 76 | 20 |
| 2 | 163 | 0.67 | 0.243 | 12 | 87 | 58 | 0 | 200 |
| 3 | 387 | 1.18 | 0.328 | 14 | 65 | 17 | 85 | 5 |
| 4 | 730 | 3.35 | 0.218 | 40 | 546 | 79 | 12 | 200 |
| 5 | 215 | 0.88 | 0.246 | 42 | 30 | 17 | 7 | 200 |

I claim:

1. In a method of producing a particulate-solid-bearing air-permeable sheet, said method including the step of entraining a particulate solid in a gaseous carrier in the substantial absence of fibrous material, said solid including particles having a mean particle size, the improvement in said method comprising the steps of:

providing a preformed air-permeable sheet, said sheet having one face and a second face and being selected from non-woven fibrous materials and open cell foam materials, which materials have a density at or below 0.25 g/cm³, said sheet having pores having a mean pore size;

disposing said one face of said sheet in the path of a stream of said gaseous carrier and entrained particulate solid, whilst maintaining a pressure drop across the thickness of the preformed air-permeable sheet from said one face to said second face of said air-permeable sheet, the mean pore size of said pores of the preformed air-permeable sheet being greater than the mean particle size of the particulate solid, thereby entrapping at least part of said entrained particulate solid on or on and in said air-permeable sheet; and fixing the entrapped particular solid on or on and in the air-permeable sheet with a binder.

2. In a method according to claim 1, the improvement further comprising:

said preformed air-permeable sheet having a density of from 0.01 to 0.18 g/cm³.

3. In a method according to claim 1, the improvement further comprising:

said maintaining step being performed by maintaining a lower gaseous pressure at said second face than that extant at said one face of said air-permeable sheet.

4. In a method according to claim 3, the improvement further comprising:
said maintaining step being performed by applying suction to said second face of said air-permeable sheet.

5. In a method according to claim 1, the improvement further comprising: the gaseous carrier being air.

6. In a method according to claim 1, the improvement further comprising:
supplying said stream of the gaseous carrier and the particulate solid in substantially free flowing form to a mixing zone, said mixing zone having an effective width and length, the substantially free flowing particulate solid material being entrained in the mixing zone in the stream of the gaseous carrier;
directing a flow of the mixture of gaseous carrier and entrained particulate solid from said mixing zone into the inlet of, through and out of the outlet of a supply zone, said supply zone having an effective width and length;
established a suction zone of variable effective length and width adjacent to and in line with the outlet of said supply zone, the effective width and length of said suction zone being greater than the effective width and length of said supply zone;
reducing the pressure in said suction zone to below that at the outlet of said supply zone; and
continuously feeding the air-permeable sheet between said supply zone and said suction zone.

7. In a method according to claim 6, the improvement further comprising:
said gaseous carrier being air,
establishing a recirculatory flow of said air, wherein said recirculatory flow includes a stream of said air at super atmospheric pressure flowing through the mixing zone and then into the supply zone;
maintaining said supply zone at atmospheric pressure;
said reducing step causing said air from said supply zone to flow into the suction zone;
maintaining said suction zone at subatmospheric pressure;
compressing said air from said suction zone to superatmospheric pressure; and
feeding said compressed air to said mixing zone.

8. In a method according to claim 1, the improvement further comprising:
providing the particulate solid in the form of active carbon.

9. In a method according to claim 1, the improvement further comprising:
the air-permeable sheet being a fibrous non-woven material.

10. In a method according to claim 1, the air-permeable sheet being an open-cell foam.

11. In a method according to claim 1, the improvement further comprising:
said pressure drop causing the gaseous carrier to flow through the air-permeable sheet from said one face to said second face; and
recirculating particulate solid entrained in said gaseous carrier leaving said second face of said air-permeable sheet, said recirculating being by returning both a portion of said gaseous carrier leaving said second face and particulate solid leaving said second face as an input for entraining step before said stream of gaseous carrier and entrained particulate solid reach said one face of said air-permeable sheet.

12. In a method according to claim 1, the improvement further comprising:
the binder being a natural or synthetic aqueous latex.

13. In a method according to claim 1, the improvement further comprising:
the binder being a latex and the air-permeable sheet having the particulate solid retained thereon or thereon and therein being impregnated with the latex; and
drying the impregnated sheet material.

14. In a method according to claim 1, the improvement further comprising:
said binder being a solid particulate water-soluble binder;
said entraining step entraining both the particulate solid and said solid particulate water-soluble binder in the gaseous carrier; and
impregnating the air-permeable sheet with an amount of water sufficient to dissolve the binder and form of a binder solution in situ in the air-permeable sheet.

15. In a method according to claim 1, the improvement further comprising:
said providing step providing said air-permeable sheet selected from said non-woven fibrous materials and open cell foam materials which are uncoated prior to said disposing step.

* * * * *